March 22, 1955  J. A. MARKOSKI  2,704,726
METHOD FOR PRODUCING A FLUORESCENT SCREEN AND PRODUCT
Filed March 30, 1951
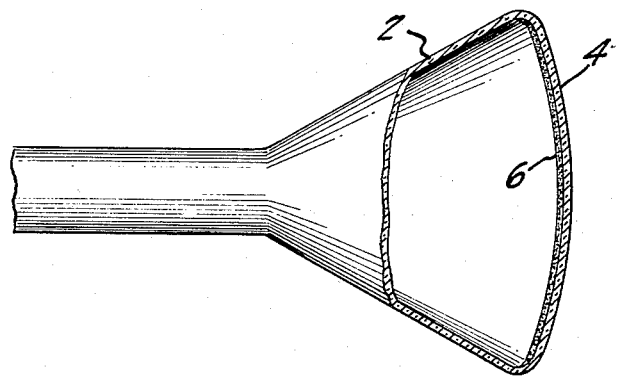
INVENTOR
JOHN A. MARKOSKI
BY
ATTORNEY

United States Patent Office 2,704,726
Patented Mar. 22, 1955

2,704,726

METHOD FOR PRODUCING A FLUORESCENT SCREEN AND PRODUCT

John A. Markoski, Lancaster, Pa., assignor to Radio Corporation of America, a corporation of Delaware Application March 30, 1951, Serial No. 218,357

9 Claims. (Cl. 117—33.5)

This invention relates to improvements in a method of treating zinc sulfide or zinc-cadmium sulfide phosphors which may be used for making fine-grained viewing screens for cathode ray tubes, and to the improved phosphors and screens which result from use of the improved method.

In kinescopes used in home television receivers, the luminescent viewing screens are desired to have as fine a grain as possible. The fine grain is desired so that the picture will have a maximum sharpness and clarity. Most luminescent screens for cathode ray tubes are made by partially filling the bell of the tube envelope with a suspension of the phosphor in a liquid settling medium. The suspension is then allowed to stand until the face of the tube is uniformly coated with a thin layer of the phosphor which has settled out by gravity from the suspending medium. If the particles of phosphor which are suspended in the liquid are too large, a coarse, grainy screen will result.

The activated zinc sulfide phosphors have long been used for making the luminescent viewing screens of cathode ray tubes because of their high efficiencies and desirable color of luminescence characteristics. For making the viewing screens of television kinescopes a mixture of two different sulfide phosphors is usually used. A blue-emitting zinc sulfide activated with silver is one of the two components and a yellow-emitting zinc-cadmium sulfide activated with silver is the other. It is well known, however, that it has, in the past, been very difficult to make zinc sulfide or zinc-cadmium sulfide phosphor screens in which the grain size of the sulfide was as low as desired.

The reason for the past difficulty that has been experienced in making fine-grained screens from these sulfide phosphors is that the individual particles of sulfide phosphors normally have a tendency to aggregate when in liquid suspension. The phosphor may be prepared by well known firing procedures and then ground to a fine state of subdivision. When this fine powder is suspended in a liquid, however, the small particles form clusters which cannot again be broken up except by long, expensive milling operations.

Sulfide phosphors have previously been treated with various materials to improve their physical properties. For example, particles of zinc sulfide have been coated with silicic acid to render them free-flowing. Finely divided zinc sulfide phosphors have also been treated to form a thin coating of zinc phosphate on the particles. The phosphate coating promotes good adherence to the glass surface of a viewing screen.

The phosphate coating is generally applied to the phosphor by suspending the powdered phosphor in water and adding the ingredients required to form the phosphate coating. As soon as the phosphor is suspended in the water, however, the fine particles begin to form larger aggregates which settle out rapidly. Thus the phosphate, instead of coating each individual fine particle, coats aggregates of particles and then aggregates are still present as such when the phosphor is employed to prepare viewing screens. The phosphate, itself, appears to have little or no effect in preventing aggregation of the fine particles.

One object of the present invention is to provide an improved method of treating fine particles of certain sulfide phosphors to render them non-aggregative.

Another object of the present invention is to provide an improved method of treating certain sulfide phosphors for making fine-grained viewing screens for cathode ray tubes.

Another object of the invention is to provide an improved zinc sulfide or zinc-cadmium sulfide phosphor better suited for making fine-grained screens than previously known phosphors of this type.

Another object of the invention is to provide an improved method of making fine-grained viewing screens for cathode ray tubes, from zinc sulfide or zinc-cadmium sulfide phosphors.

Still another object of the invention is to provide an improved luminescent viewing screen made of at least one of a class consisting of zinc sulfide and zinc-cadmium sulfide phosphors.

In brief, the improved method of the present invention comprises providing individual particles of a phosphor of the class consisting of zinc sulfide and zinc-cadmium sulfide with a very thin coating of zinc metasilicate. The coating may be applied by suspending the phosphor in distilled water and adding a sodium or potassium silicate solution. The phosphor must have associated therewith at least a small quantity of zinc ion. The zinc ion reacts with the silicate to precipitate a thin coating of zinc silicate on each phosphor particle. The phosphor is then permitted to settle out of the suspension and is washed and dried. The dry powder may then be stored for indefinite periods and, when later made into suspensions for settling onto the inner surface of the viewing face plate of a cathode ray tube, will not aggregate to any appreciable extent. The phosphor particles, coated with zinc metasilicate, may also be provided with a coating of zinc phosphate.

The invention also includes particles of zinc sulfide or of zinc-cadmium sulfide coated with thin layers of zinc metasilicate and with successive layers of zinc metasilicate and zinc phosphate, and improved viewing screens made of the improved coated phosphor particles.

The single figure of the drawing is a cross section view of a cathode ray tube envelope having a face plate, on the inner surface of which is a layer of phosphor forming a luminscent viewing screen in accordance with one aspect of the present invention.

A specific example of utilizing the improved method of treatment to form the improved product of the present invention will now be given.

Example 1

100 g. silver-activated ZnS phosphor, prepared by firing with sodium chloride flux, is suspended in 600 cc. distilled water. The phosphor, as normally prepared with the aid of the chloride flux, contains traces of zinc chloride and sodium chloride which are almost impossible to remove by ordinary washing operations. The zinc chloride, however, is beneficial in that it furnishes some available zinc ion. To the phosphor suspension is added 1 cc. of a 5% by wt. solution of potassium silicate (calculated as anhydrius $K_2SiO_3$). Thus the 600 cc. of solution (exclusive of the 100 g. of phosphor) contains the potassium silicate in a concentration of only about .0083% by weight. Or, in other words, the silicate is present in the ratio of about .05% by weight of the phosphor. An analysis of the product shows that a very thin coating of a precipitate of zinc metasilicate coats the individual phosphor particles.

The treated phosphor is allowed to settle to the bottom of the container, the excess liquid is decanted and the phosphor is then washed thoroughly. It is preferable to wash 4 times, each wash consisting of about 600 cc. of distilled water, in the case of a 100 g. lot of phosphor.

The washed phosphor is then preferably dried at least 12 hours at a temperature of about 150°–175° C. Time and temperature of drying are not critical.

In the improved process of the present invention, it is necessary that, at least, traces of zinc ion be present. If the phosphor is originally fired by a process that will not leave traces of zinc ion in the product, it is necessary to add very small amounts of some soluble compound of zinc such as the chloride or sulfate. The amount of zinc ion present must be sufficient to react with the silicate specified.

The amount of silicate, although minute, produces greatly improved results in comparison to omitting it altogether. When no silicate is added to the suspension of phosphor in distilled water, the phosphor settles out rapidly leaving a clear supernatant liquid. This shows that even the very finest particles have become aggregated enough to settled out and a screen made of this material is noticeably coarse-grained. When the silicate is added as directed in the above example, however, the phosphor settles over a longer period of time and the supernatant liquid remains cloudy. Screens made of the phosphor thus treated are fine-grained and commercially acceptable for home television use.

The amount of potassium silicate added to the phosphor suspension is fairly critical for good results. The amount cited in the example is about the minimum that produces satisfactory results. If too large a concentration is used, the silicate coating becomes sufficiently thick to noticeably lower the efficiency of the phosphor when in a cathode ray tube. The silicate coating, which is too thick, impedes the travel of electrons to the phosphor from the electron gun. The maximum concentration of silicate that should be used is about .15% by weight of the phosphor.

Instead of potassium silicate, sodium silicate may be used in the same proportions given for potassium silicate. The effect on preventing the aggregation of the fine particles of phosphor is the same in the case of both silicates. Potassium silicate is somewhat preferred, however, from the standpoint of producing a phosphor less susceptible to "burning" effects under intense electron bombardment for long periods.

The reaction between the zinc ion and the silicate which is present is substantially quantitative. Hence, all of the sodium or potassium silicate present may be assumed to be converted to zinc metasilicate. Although this will change the weight proportion slightly between the phosphor and the silicate coating material, the difference is a minor one. For example, when potassium silicate is used, the weight percent of the zinc silicate which is formed in proportion to the weight of the phosphor, would be from about 0.042 to 0.127.

Although the invention has been illustrated in connection with the preparation of an improved zinc sulfide phosphor, the process is equally effective in preventing the aggregation of fine particles of zinc-cadmium sulfide phosphors. In the latter case, the process is carried out in the same manner as described in the example, using the same silicates and the same proportions of materials.

Although the sulfide phosphor having its individual particles coated with a very thin layer of zinc metasilicate has general application in the preparation of luminescent viewing screens by any one of several processes, it offers particular advantage when the phosphor is further treated to provide it with a coating of zinc phosphate for adherence purposes.

Example II

To the 100 g. suspension of zinc sufide phosphor in 600 cc. distilled water having the 1 cc. of the 5% by wt. solution of potassium silicate added, as described in Example I, add 10 cc. of a zinc sulfate solution having a concentration of 56 g./l. of anhydrous zinc sulfate. The amount of zinc sulfate added to the solution is thus 0.56 g. To this mixture is also added 9 cc. of a solution of trisodium phosphate having a concentration of 152 g./l. of $Na_3PO_4 \cdot 12H_2O$. This is equivalent to 65.5 g./l. of the anhydrous phosphate. The 9 cc. of solution would therefore contain about 0.59 g. of the $Na_3PO_4$.

An outer coating of zinc phosphate is formed on the silicate-coated phosphor particles in the suspension by means of this process. Since substantially all of the sodium phosphate which is added is used up in the reaction it follows that the phosphate must be present in approximately stoichiometric proportions. And since the 0.59 g. of sodium phosphate is greater than the amount which would be equivalent to 0.56 g. of zinc sulfate, there must be some zinc ion present before the zinc sulfate is added. The amount of zinc phosphate formed is about 0.85 g. Substantially all of this is deposited on the phosphor. The amount of phosphate is critical if good, commercially acceptable results are desired. It is possible, however, to vary the reactants such that from about 0.45 to about 0.90 g. of zinc phosphate is formed. After mixing the sulfate and phosphate with the suspension, the phosphor is allowed to settle. The supernatant liquid is then decanted and the product is washed and dried as described in Example I.

The product, made as described is either of the above two examples, may be used to prepare a luminescent viewing screen on the inner surface of the face plate of a cathode ray tube. The screen may be prepared by any well known process. For example, the tube envelope may be placed neck upward and a quantity of distilled water poured into the open end to serve as a cushioning medium. The dried phosphor particles, prepared as above described, may then be made up into a suspension in distilled water and poured into the cushioning liquid in the tube. A solution of sodium or potassium silicate may be added to serve, in this case, as a binder for the screen particles. The phosphor particles are permitted to settle onto the inner face of the tube envelope to form a layer and the supernatant liquid is slowly decanted. The phosphor screen is then dried and baked to drive off all volatile materials. The screen which is formed may then be similar to that shown in the drawing. In the single figure of the drawing, a cathode ray tube 2 having a face plate 4 has a phosphor screen 6 deposited on the inner surface of the face plate. This screen may be prepared using the coated phosphor particles and the settling process described above. The improved screen constitutes one important aspect of the present invention.

There has been described an improved process of preparing zinc sulfide or zinc-cadmium sulfide phosphors to render them non-aggregative. Any of the activators commonly used in these phosphors may, of course, be used when the phosphors are treated by the present process. The product which results is of excellent quality for making fine-grained luminescent viewing screens for television kinescopes or for image tube screens or other desired purposes. The screens which are made of the improved phosphors are also of improved quality in respect to their viewing characteristics.

Using the process of the present invention, long and expensive milling operations may be eliminated. The process therefore offers a cost reduction in the preparation of the phosphors for which it is intended.

What is claimed is:

1. In a method of treating a powdered phosphor of the class consisting of zinc sulfide and zinc-cadmium sulfide to be used in making luminescent viewing screens, the steps comprising, first, coating the particles of said phosphor while suspended in an aqueous medium with a very thin coating of zinc metasilicate, said silicate being present in the amount of about 0.04 to 0.13 percent by weight of said phosphor, and then applying a thin coating of zinc phosphate over the silicate coating while said coated particles are suspended in an aqueous medium.

2. In a method of treating a powdered phosphor of the class consisting of zinc sulfide and zinc-cadmium sulfide to be used in making luminescent viewing screens, the steps comprising suspending said phosphor in a very dilute aqueous solution of a material from the class consisting of sodium silicate and potassium silicate and containing traces of zinc ion, in which said silicate is present in an amount of about 0.05 to about 0.15% by wt. of said phosphor and then precipitating on the particles of said phosphor while suspended in an aqueous medium a thin film of zinc phosphate.

3. In a method of treating a powdered phosphor of the class consisting of zinc sulfide and zinc-cadmium sulfide to be used in making luminescent screens, the steps comprising suspending said phosphor in a very dilute aqueous solution of a material from the class consisting of sodium silicate and potassium silicate and containing traces of zinc ion, in which said silicate is present in an amount of about 0.05 to about 0.15% by wt. of said phosphor, and then incorporating with said suspension a quantity of sodium phosphate such that the phosphor particles become coated with zinc phosphate.

4. A method according to claim 3 including the additional steps of separating the coated phosphor particles from the suspending liquid and drying.

5. A method of making a luminescent viewing screen comprising a layer of a phosphor from the class consisting of zinc sulfide and zinc-cadmium sulfide on a base, comprising coating the individual particles of said phosphor while suspended in an aqueous medium with a very thin coating of zinc metasilicate, said silicate being present in the amount of about 0.04 to 0.13 percent by weight of said phosphor, applying a very thin coating of zinc phosphate over said silicate coating while said coated particles are suspended in an aqueous medium, and settling said coated phosphor particles on said base from an aqueous suspension of said phosphor.

6. A method of making a luminescent viewing screen comprising a layer of a phosphor from the class consisting of zinc sulfide and zinc-cadmium sulfide on a glass base, comprising forming a suspension of said phosphor, in finely divided form, in a very dilute aqueous solution of a material from the class consisting of sodium silicate and potassium silicate, said silicate being present in an amount of about 0.05 to about 0.15% by wt. of said phosphor, incorporating in said suspension a quantity of zinc phosphate such that the particles of phosphor become coated with said phosphate, and subsequently settling a layer of said coated phosphor particles on said glass base from a liquid suspension of said particles.

7. In a method of making a luminescent viewing screen comprising a layer of a phosphor from the class consisting of zinc sulfide and zinc-cadmium sulfide on a glass base, by settling said phosphor on said base from an aqueous suspension of finely divided phosphor particles, the steps of coating said particles while suspended in an aqueous medium with a very thin layer of zinc metasilicate, said silicate being present in the amount of about 0.04 to 0.13 percent by weight of said phosphor, and coating said particles while suspended in an aqueous medium with a thin layer of zinc phosphate surrounding said layer of zinc metasilicate, preceding said settling operation.

8. A luminescent viewing screen comprising a glass base having on a surface thereof a layer of a phosphor from the class consisting of zinc sulfide and zinc-cadmium sulfide, the particles of said phosphor being individually coated with a very thin layer of zinc metasilicate, said silicate being present in the amount of about 0.04 to 0.13 percent by weight of said phosphor, and with a layer of zinc phosphate surrounding said layer of zinc metasilicate.

9. A luminescent material comprising particles of a phosphor selected from the group consisting of zinc sulphides and zinc-cadmium sulphides, said particles being individually coated with a very thin layer of a zinc metasilicate, said silicate being present in an amount of about 0.04 to 0.13% by weight of said phosphor and further being coated with a thin layer of zinc phosphate surrounding said layer of zinc metasilicate.

References Cited in the file of this patent

UNITED STATES PATENTS

| | | |
|---|---|---|
| 2,069,710 | Missbach | Feb. 2, 1937 |
| 2,223,830 | Leverenz | Dec. 3, 1940 |
| 2,311,513 | Bell et al. | Feb. 16, 1943 |
| 2,322,265 | Weyl | June 22, 1943 |
| 2,477,070 | Leverenz | July 26, 1949 |
| 2,529,711 | Smith | Nov. 14, 1950 |

FOREIGN PATENTS

| | | |
|---|---|---|
| 521,099 | Great Britain | May 13, 1940 |